United States Patent
Eriksson

(10) Patent No.: US 6,836,473 B1
(45) Date of Patent: Dec. 28, 2004

(54) METHOD FOR DOWNLINK ATTENUATION BASED ON MOBILE PROTOCOL VERSION

(75) Inventor: Ulf Eriksson, Kil (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 807 days.

(21) Appl. No.: 09/625,361

(22) Filed: Jul. 25, 2000

(51) Int. Cl.$^7$ .............................................. H04B 7/212
(52) U.S. Cl. ..................................... 370/337; 370/347
(58) Field of Search ................................ 370/278, 311, 370/329, 318, 333, 328, 330, 344, 337, 347; 455/69, 553, 552, 533, 452.2, 458, 451, 426.1

(56) References Cited

U.S. PATENT DOCUMENTS

| | | | |
|---|---|---|---|
| 5,412,375 A | * 5/1995 | Wood | 455/451 |
| 5,491,837 A | * 2/1996 | Haartsen | 455/62 |
| 5,666,649 A | 9/1997 | Dent | |
| 5,761,623 A | * 6/1998 | Lupien et al. | 455/450 |
| 5,884,145 A | 3/1999 | Haartsen | |
| 5,887,262 A | * 3/1999 | Willhoff | 455/452.1 |
| 5,960,351 A | 9/1999 | Przelomiec | |
| 5,966,657 A | 10/1999 | Sporre | |
| 6,091,954 A | 7/2000 | Haartsen et al. | |
| 6,104,930 A | * 8/2000 | Ward et al. | 455/450 |
| 6,163,698 A | * 12/2000 | Leitch et al. | 455/450 |
| 6,269,250 B1 | * 7/2001 | Bender et al. | 455/522 |

OTHER PUBLICATIONS

Tom Farley, "IV. Basic Wireless Principles", Apr. 25, 2000, pp. 1–5.

* cited by examiner

Primary Examiner—Chau Nguyen
Assistant Examiner—Soon-Dong Hyun

(57) ABSTRACT

In a TDMA (Time Division Multiple Access) wireless communication system, mobile stations are sorted according to their PV (Protocol Version), and packed by an enhanced FRP (Frequency Re-Packing) function or an enhanced IDCS (Interference Driven Channel Selection) function so mixing of mobile stations with different PVs on the same carrier will be avoided as far as possible. This allows mobile station capabilities to be used with greater advantage, in situations where a protocol or other performance feature used on a carrier must be compatible with the least capable mobile station on the carrier. In a broader sense, the mobile stations can be sorted and then allocated based on any appropriate indicator of mobile station capability, for example PV, mobile station ESN (Electronic Serial Number), and so forth. In this way, a common capability of all mobiles on the same carrier, can be maximized for some or all carriers within a cell. Thus, an overall efficiency or performance level of the mobile system can be enhanced or maximized.

9 Claims, 7 Drawing Sheets

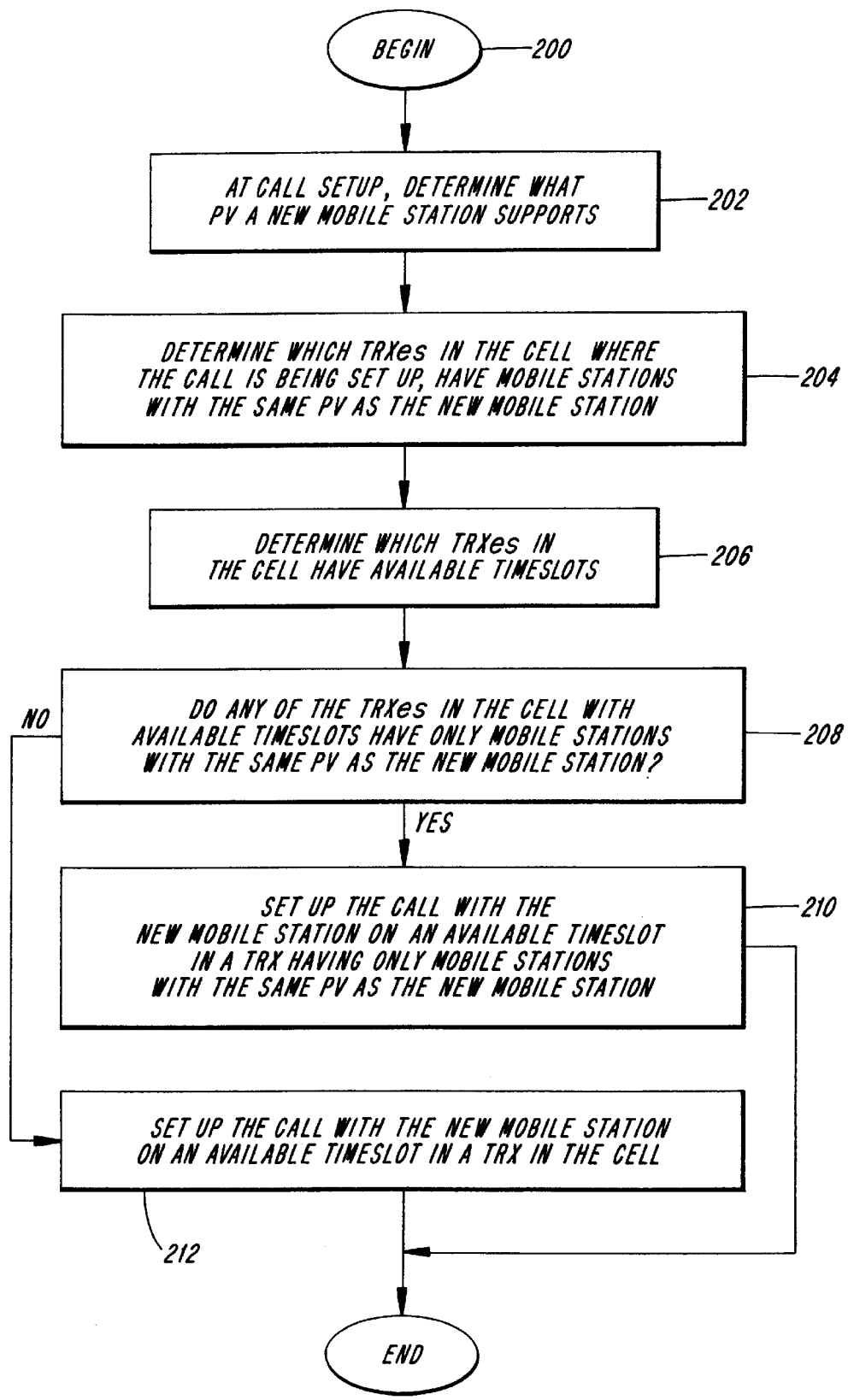

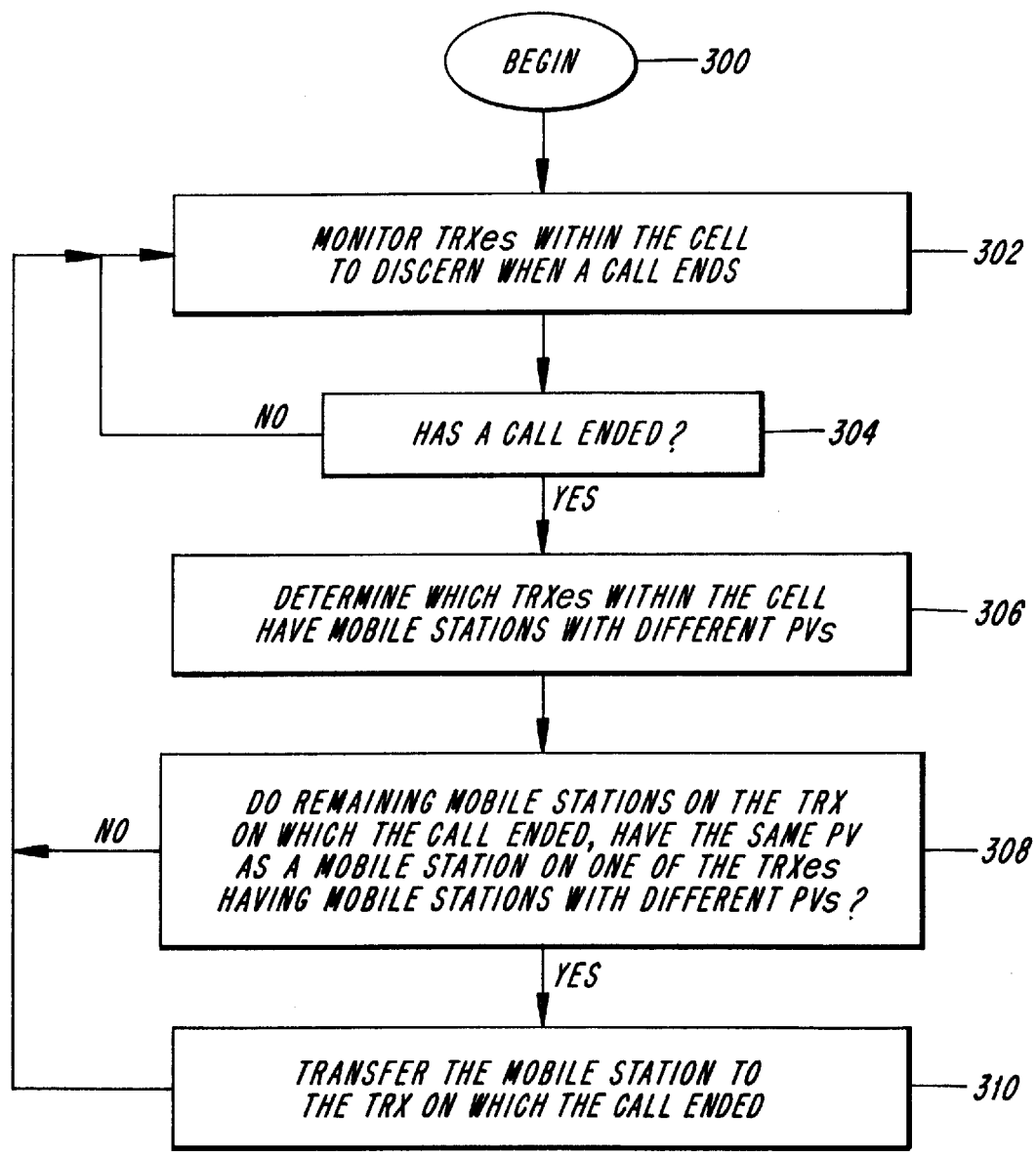

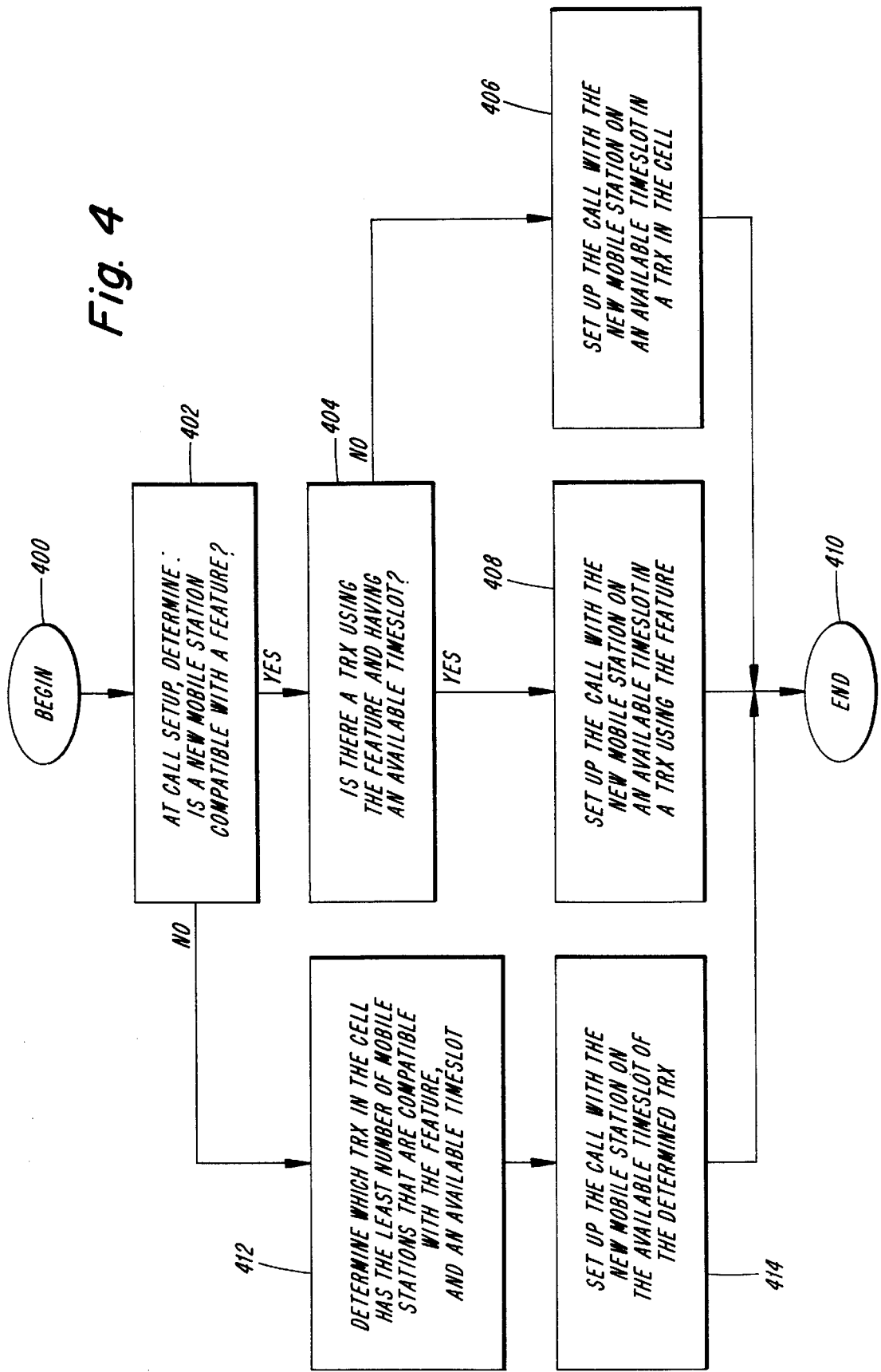

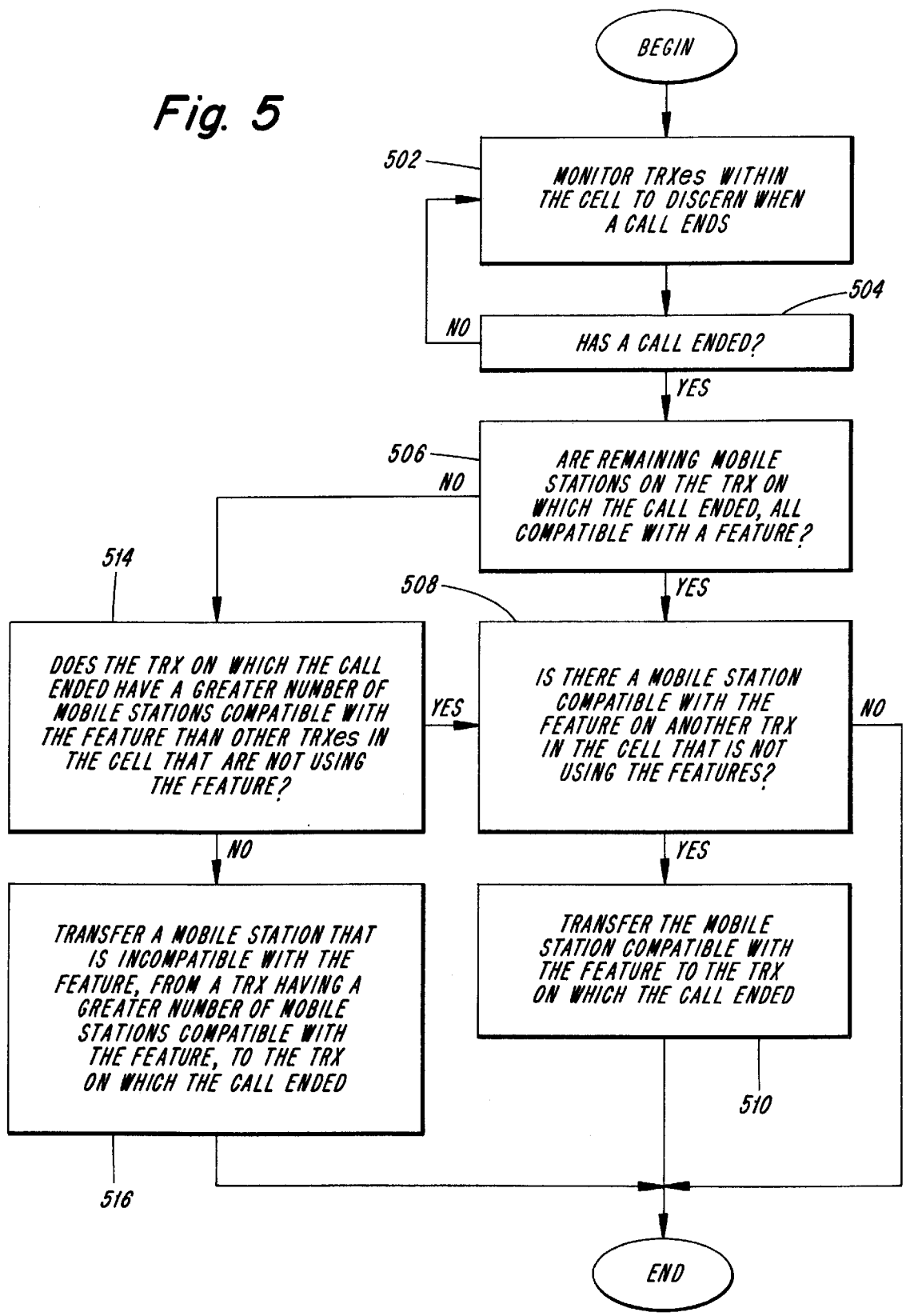

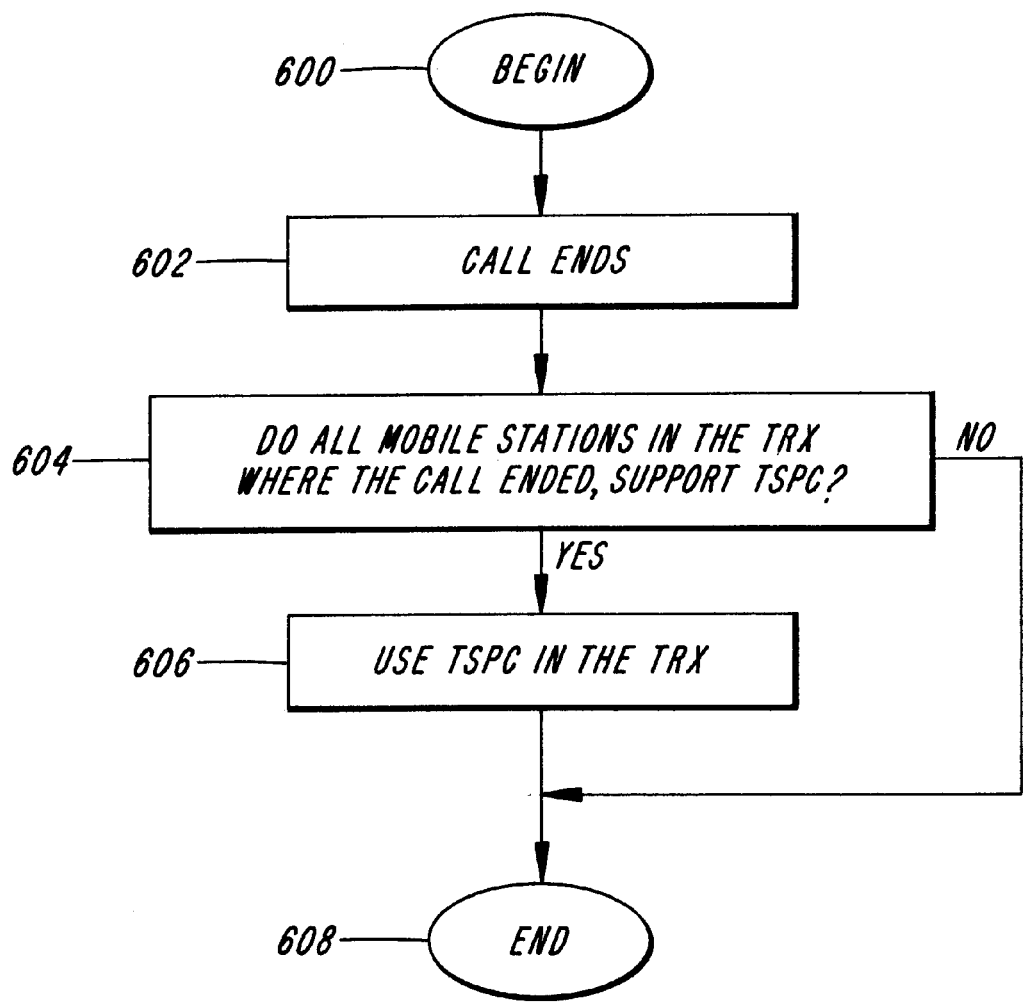

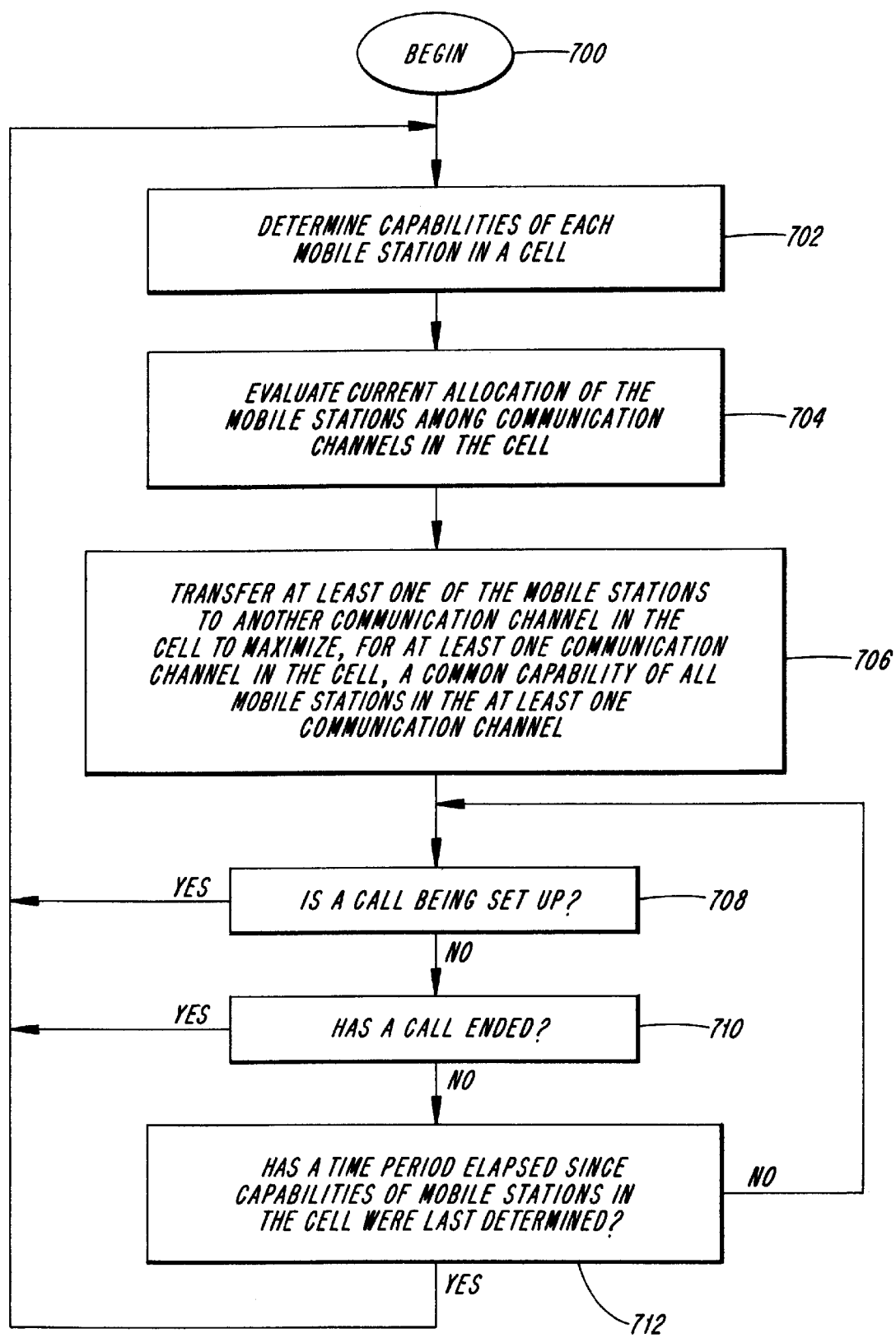

METHOD FOR DOWNLINK ATTENUATION BASED ON MOBILE PROTOCOL VERSION

BACKGROUND OF THE INVENTION

1. Field of the Invention

The present invention relates generally to the field of downlink timeslot power control in TDMA (Time Division Multiple Access) based wireless communication networks having mobile stations.

2. Description of Related Art

In a telecommunications system, e.g., a cellular radio system, any one of several access strategies may be employed, for example, FDMA (Frequency Division Multiple Access), CDMA (Code Division Multiple Access), or TDMA.

In North America, a digital cellular radiotelephone system using TDMA is called D-AMPS (Digital Advanced Mobile Phone System), some of the characteristics of which are specified in the TIA/EIA-136 standard published by the Telecommunications Industry Association and Electronic Industries Association (TIA/EIA). Another digital communication system, using direct sequence CDMA, is specified by the TIA/EIA/IS-95 standard. There are also frequency hopping TDMA and CDMA communication systems, one of which is specified by the EIA SP 3389 standard (PCS 1900). The PCS 1900 standard is an implementation of the GSM system, which is common outside North America, that has been introduced for PCS (Personal Communication Services) systems.

In an FDMA based system, the frequency spectrum is divided into a number of disjunctive frequency bands, where each band serves as a separate radio channel. In a system that employs CDMA, spreading codes are used to distinguish the various radio channels.

In a TDMA based system, however, the time domain is divided into time frames. Each time frame is then further divided into a number of timeslots, for example, three timeslots. Thus, each carrier frequency-timeslot combination constitutes a different physical channel over which a communications signal burst can be transmitted. In a cellular radio telecommunications system, a communications signal burst transmitted from a mobile station to a corresponding radio base station is referred to as an uplink burst. In contrast, a communications signal burst transmitted from the radio base station to the mobile station is referred to as a downlink burst.

FIG. 1 illustrates a conventional TDMA cellular radio system including cells C1–C10 and base stations B1–B10, one base station per cell. The base stations are typically situated in the vicinity of the cell center and have omnidirectional antennas. The base stations of adjacent cells may, however, be co-located in the vicinity of cell borders and have directional antennas, as is well known to those skilled in the art. Each base station typically supports multiple carrier frequencies, and adjacent base stations have different sets of carrier frequencies to prevent or reduce interference.

The system also includes mobile stations M1–M10 that are movable within a cell and from one cell to another. An MSC (Mobile Switching Center) is connected to the base stations by, for example, cables or fixed radio links. The MSC is also connected to a fixed public switching telephone network or a similar fixed network with ISDN facilities. In addition to the MSC illustrated in FIG. 1, there may also be other mobile switching centers.

Power control, or in other words the ability to modify or adjust the power levels associated with communications signal bursts, particularly, downlink communications signal bursts transmitted from a base station to a mobile station, is important in a telecommunications system to ensure that the signal quality associated with a given channel is adequate. Power control also helps improve the spectral efficiency of the system as a whole by a) balancing average, system-wide signal quality and system capacity, and b) effectively limiting the emitted energy that acts as interference at radio connections with other mobile stations, or in other words, reducing interference from co-channels.

Downlink power control relies on received signal quality and received signal strength as reported from the mobile station in order to regulate the base station output power so that minimum requirements for speech quality are fulfilled but energy emitted is minimized to keep interference low. For this purpose, algorithms are implemented in the base stations which use measurement results transmitted from the mobile station. The parameter can include, for example, the measured quality and the measured RSSI (Received Signal Strength Information) of the downlink data, and radio network management parameters transmitted from the MSC, such as acceptable speech quality. A more detailed description of downlink power control is provided in U.S. patent application Ser. No. 09/399,764, filed Sep. 21, 1999, now U.S. Pat. No. 6,529,494 which is incorporated herein by reference.

In accordance with the TDMA standard, IS-136 Rev. A, with which a large number of mobile stations comply, downlink transmission power level remains constant throughout each time frame. Thus, a mobile station receiving a downlink burst during a given timeslot expects the power level of the received burst to remain constant, or nearly constant, over the timeslot, notwithstanding attenuations due to fading. However, it is highly probable that the TDMA standard (or other future standards) will soon incorporate downlink power control, where the transmission power level from timeslot to timeslot may be adjusted, to achieve better signal quality and spectral efficiency. This adjustment technique is often referred to as Time Slot Power Control (TSPC).

If the TDMA standard incorporates downlink power control, as introduced in the ANSI 136 rev. A specification, mobile stations which are designed in accordance with the present TDMA standards (i.e., legacy mobile stations), particularly those mobile stations that are not designed to measure RSSI (Received Signal Strength Information) during the timeslot in which they are receiving downlink data, may be unable to accurately measure and report RSSI.

It has been shown that mobile phones made with the earlier IS-136 and IS-54B specifications can also handle TSPC (TimeSlot Power Control), i.e., downlink power control in each timeslot, given that certain limitations on signal strength variation between timeslots are observed. Note that IS-136.2, rev. A specifies (see, e.g., chapter 2.4.5.4.1.2.1) how the RSSI reported by the mobile station to the base station in the Channel Quality Message, is obtained. In accordance with IS-136.2, Rev A, RSSI values for 25 frames received during one second, are summed and then divided by 25 to obtain an average RSSI that is reported by the mobile station to the base station. However, the standard does not specify which part or parts of a received burst or frame shall be measured to obtain the RSSI value for that frame. As indicated above, mobile phones from different manufacturers often use different methods, for example by measuring at different times in a frame, to determine downlink channel signal strength. Thus, when TSPC is used to control downlink power in each timeslot so that downlink channel signal transmission power levels vary during a frame, mobile stations from different manufacturers will report different, and likely inaccurate, RSSIs for the same timeslots.

In summary, although TSPC can provide many advantages, not all mobile stations will be equipped to support TSPC. The PV (Protocol Version) of a mobile station indicates the air interface protocol standard (such as TIA/EIA 136 Rev. A) that the mobile station is capable of supporting. Since neither the current nor the previous versions of the air interface protocol standard support downlink power regulation on a per timeslot basis, mobile stations with older PVs may not be able to handle TSPC. The TSPC feature handles this by discerning whether any mobile stations using a particular carrier or communication channel are incapable of supporting TSPC. This can be done, for example, using PV information provided by the mobile stations.

If any one of several mobile stations using a carrier cannot support TSPC, then TSPC is turned off for that carrier and only BSPC (Base Station Power Control, or carrier based power control) is used. Thus, the system will have to operate on that carrier using a protocol that all of the mobile stations using the carrier can support or comply with, even though some of the mobile stations support more advanced protocols and associated features. In other words, where some of the mobile stations on the carrier are more advanced than other mobile stations on the carrier, the advanced capabilities cannot be used, because communications on the carrier must operate at the level of the least capable mobile station. Unfortunately, BSPC is less efficient in reducing co-channel interference than TSPC. This makes it more difficult to transition from a 7/21 cell reuse plan to a 4/12 cell reuse plan, and in a worst case will prevent the transition. To further complicate matters, a new air interface protocol standard will likely be coming soon, and will probably implement TSPC differently from the way it is implemented now.

Thus, future TDMA systems will have at least three types of mobile station to handle: 1) old mobile stations that only support BSPC, 2) old mobile stations that support BSPC and old TSPC, and 3) new mobiles that support both BSPC and new TSPC. Accordingly, one challenge will be, how to most efficiently interact with different types of mobile station.

SUMMARY OF THE INVENTION

In accordance with an exemplary embodiment of the invention, mobile stations are sorted according to their capabilities, and are packed by an enhanced FRP (Frequency Re-Packing) function or an enhanced IDCS (Interference Driven Channel Selection) function so mixing of mobiles having different capabilities on the same carrier will be avoided as far as possible.

In accordance with exemplary embodiments of the invention, the sorting can be done using information that indicates or corresponds to capabilities of a mobile station. For example, mobile stations can be sorted by PV. Alternatively, mobile stations can be sorted by their respective electronic serial numbers (ESNs). The ESN can contain one or more codes indicating performance capabilities of the mobile station, or a chart or table can be consulted that maps ESN numbers to performance capabilities. Any appropriate identifier or information that indicates performance capability of the mobile station, can be used as a sort key.

In accordance with an exemplary embodiment of the invention, capabilities of each mobile station in a cell can be determined, and then a current allocation of the mobile stations among carriers in the cell can be evaluated. Next, various mobile stations in the cell can be transferred to different carriers, as appropriate, to re-allocate the mobile stations in the cell to maximize, for at least one carrier in the cell, a common capability and/or a performance level of all mobile stations on that carrier. This process can be repeated as necessary or appropriate, for example upon the setup of a new call, upon the ending of an existing call, or upon the expiration of a predetermined time period.

In accordance with an exemplary embodiment of the invention, at call setup the MSC can determine a mobile station's PV, or other indicator of the mobile station's performance capability. This can be done by observing a capability report from the mobile station on the DCCH (Digital Control CHannel) when the mobile station locks into a DCCH. Alternatively, when a call has been (or is being) set up on a DTC (digital voice channel), the MSC can obtain a mobile station's PV (or other appropriate performance indicator) by sending an explicit request such as a CUR (Capability Update Request) to the mobile station and receiving a reply, via an RBS (Radio Base Station).

The MSC can then look in the cell where the call is being set up to check whether any mobile stations with the same PV or performance capability are already using a transceiver (TRX) corresponding to a base station within the system, and whether there are any idle timeslots on any of those TRXes. The MSC then sets up the new call on a timeslot in the TRX whose mobile stations have the same PV or performance capability as the new mobile station.

If no timeslot is idle or available in an optimal TRX, then the call can be set up on a sub-optimal TRX, for example on a TRX having one or more mobile stations whose PV or performance capability is different from the PV or performance capability of the new mobile station. The mobile station can then be transferred later to an optimal TRX when a timeslot becomes available, as described below.

In accordance with another exemplary embodiment or aspect of the invention, a TRX (e.g., TRX-1) having ongoing calls for mobile stations with different PVs, some of which do not support TSPC, is monitored. Since some of the mobile stations cannot support TSPC, the TRX-1 is prevented from running TSPC. As soon as a call ends on another TRX (e.g., TRX-2), the MSC checks to see if the PVs or performance capabilities of any mobile stations still using TRX-2 have the same PV or performance capability as any of the mobiles on TRX-1. If yes, then an intracell handoff is performed from TRX-1 to TRX-2 of the mobile with a corresponding PV or performance capability, in order to pack mobiles with the same PV performance capability on the same TRX.

This same procedure can be used to transfer mobile stations from TRX-2 to TRX-1. Thus, even when both TRX-1 and TRX-2 initially each have a mixture of mobile stations having different PVs or performance capabilities, by the transferring process the mobile stations are divided into groups according to PV or performance capability so that TRX-1 has one group, and TRX-2 has the other group. In this way the full capabilities represented by each PV (or other appropriate indicator) can be used as much as possible.

If there are more than two different PVs or performance capabilities represented by the mobile stations, then mobile stations can be transferred so that all of the mobile stations on one of the TRXes have the same PV or performance capability (even if the PVs or performance capabilities on the other TRX are mixed), and at least one of the two TRXes can run TSPC. In summary, mobile stations can be transferred among TRXes so that advanced features such as TSPC can be run on as many TRXes as possible.

BRIEF DESCRIPTION OF THE DRAWINGS

Other objects and advantages of the invention will become apparent to those skilled in the art from the following detailed description of preferred embodiments, when read in conjunction with the accompanying drawings. Like elements in the drawings have been designated by like reference numerals.

FIG. 2 shows a sequence of steps in accordance with a first exemplary embodiment of the invention.

FIG. 3 shows a sequence of steps in accordance with another exemplary embodiment of the invention.

FIG. 4 shows a sequence of steps in accordance with another exemplary embodiment of the invention.

FIG. 5 shows a sequence of steps in accordance with another exemplary embodiment of the invention.

FIG. 6 shows a sequence of steps in accordance with another exemplary embodiment of the invention.

FIG. 7 shows a sequence of steps in accordance with another exemplary embodiment of the invention.

DETAILED DESCRIPTION OF THE INVENTION

Figure 1:
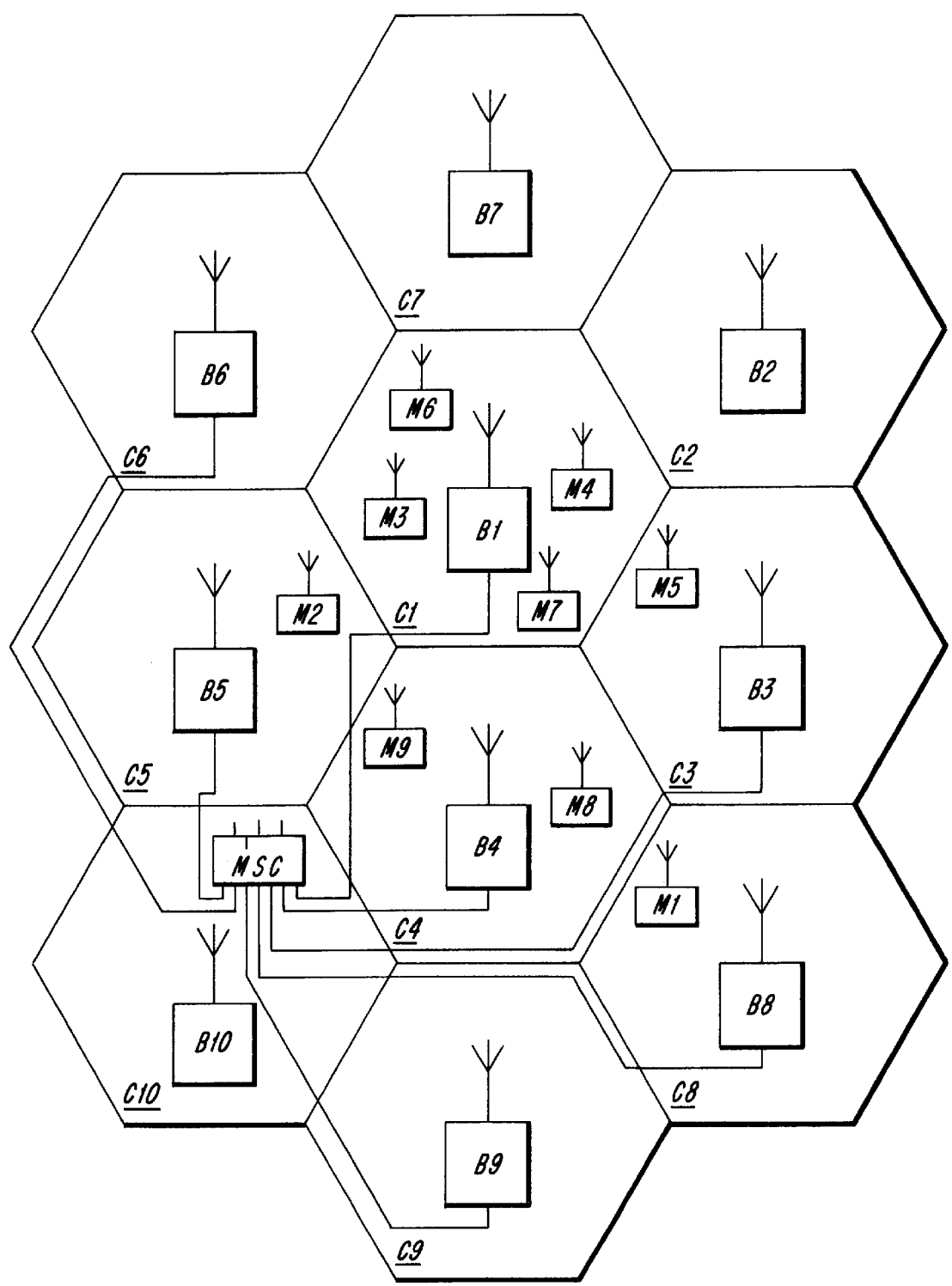
FIG. 1 illustrates a conventional TDMA cellular radio system including cells and base stations.

In accordance with exemplary embodiments of the invention, mobile stations are sorted according to capability, for example via a characteristic such as PV or ESN, and are packed by an enhanced FRP function to maximize a common performance capability or actual performance level of mobiles on the same carrier. The performance capability can be, for example, a capability that can be used on the carrier only when all of the mobiles on the carrier possess the capability.

FIG. 7 illustrates principles of exemplary embodiments of the present invention. As shown in FIG. 7, control begins at step 700 and then proceeds to step 702, where capabilities of all mobile stations in a cell are determined. From step 702 control proceeds to step 704, where a current allocation of mobile stations among carriers in the cell is evaluated. From step 704 control proceeds to step 706, where one or more mobile stations are transferred to different carriers within the cell. The mobile stations are transferred to maximize, for one or more carriers in the cell, a common capability of all mobile stations on the carrier. Thus, in situations where utilization of a function or feature on a carrier is limited by capabilities of a least capable mobile station on the carrier, the transfers appropriately re-allocate mobiles stations among the carriers, and increase the use of the function or feature on one or more of the carriers. In other words, overall performance, or performance on the whole, of the mobile system is increased.

In steps 708–712, determinations are made as to when it is appropriate to perform this optimization process again. In particular, from step 706 control proceeds to step 708, where a determination is made as to whether a call is being set up. If yes, then it is appropriate to reevaluate the current allocation of mobile stations among the carriers in the cell, and control returns to step 702. If no, then control proceeds from step 708 to step 710, where a determination is made as to whether a call has just ended. If yes, then it is appropriate to re-evaluate the current allocation of mobile stations among the carriers in the cell, and control returns to step 702. If no, then control proceeds from step 710 to step 712, where a determination is made as to whether a specific time period has elapsed, since capabilities of mobile stations in the cell were last evaluated. This time period can be, for example, a pre-determined time period. If no, then control returns to step 708, and monitoring for conditions that merit re-evaluation of the present allocation, continues. If yes, then control returns to step 702. Re-evaluating the present allocation upon expiration of a time period can be useful, for example, to address situations where mobile stations are, or have been, transferred among carriers within the cell for reasons other than efficiency. For example, re-evaluation can be appropriate after a carrier becomes unavailable or unusable due to outside interference, in the event of a malfunction of one or more base stations and/or mobile stations, and so forth. With respect to step 702 of determining capabilities of each mobile station in a cell, a fresh determination for each mobile station can be made each time this step is encountered.

Alternatively, in accordance with an exemplary embodiment of the invention, if step 702 is being repeated, then only mobile stations that are newly present in the cell since the last time step 702 was performed, are evaluated for their capabilities. As a further option, mobile stations whose capabilities may have changed in the interim since the last time step 702 was performed, can also be evaluated for their capabilities, Capability data for the other mobile stations in the cell, that was obtained during an earlier performance of step 702 and which has not changed in the interim, can simply be reused.

In accordance with another exemplary embodiment of the invention, FIG. 2 shows a specific technique for allocating mobile stations among carriers in a cell. As shown in FIG. 2, in a first step 202 the MSC determines at call setup involving a mobile station, what PV the mobile station supports. Control proceeds from step 202 to step 204, where the MSC monitors the cell where the call is being set up, to check whether the TRXes in the cell have any mobile stations with the same PV as the mobile station for which the call is being set up. From step 204, control proceeds to step 206, where the MSC determines which TRXes in the cell have available timeslots. From step 206 control proceeds to step 208, where the MSC determines whether any of the TRXes in the cell with available timeslots, have only mobile stations with the same PV as the mobile station for which the call is being set up. If one or more of such TRXes exists, then control proceeds from step 208 to step 210, where the call is set up with the station on an available timeslot in one these TRXes, so that the TRX can begin to use (or continue using) TSPC. If in step 208 it was determined that none of the TRXes in the cell with available timeslots had only mobile stations with the same PV as the mobile station for which the call is being set up, then control proceeds from step 208 to step 212, where the call is set up with the mobile station on any appropriate, available timeslot in a TRX in the cell. From each of steps 210 and 212, control proceeds to an endpoint 214 for the process. In the process shown in FIG. 2, other appropriate performance indicators or indices, such as ESN for example, can be used instead of the PV.

FIG. 6 shows an exemplary method or sub-method which can be used either separately from, or together with, other exemplary embodiments of the invention. As shown in FIG. 6, the process starts at step 600, and proceeds to step 602, where a call ends in a normal fashion. From step 602 control proceeds to step 604, where a determination is made, as to whether the remaining mobile stations in the TRX in which the call ended, support TSPC. If not, then control proceeds to step 608, where the process ends. If the remaining mobile stations in the TRX do support TSPC, when control proceeds from step 604 to step 606, where TSPC is used in the TRX. From step 606 control proceeds to step 608, where the process ends.

FIG. 3 shows a method or process that can be used separately from, or together with, the process shown in FIG. 2. In particular, in a first step 302, the MSC monitors the TRXes to discern call endings. From step 302 control proceeds to step 304, where the MSC determines whether a call has ended. If not, then control returns to step 302, so that the MSC will continue to monitor the TRXes until a call ends. If in step 304 the MSC realizes that a call has ended, then control proceeds to step 306 where the MSC determines which TRXes within a cell each have mobile stations with different PVs.

From step 306 control proceeds to step 308 where the MSC determines whether remaining mobile stations on the TRX for which the call ended, have the same PV as one of the mobile stations on one of the TRXes which have mobile stations with different PVs. If the determination in step 308 is negative, then control returns to step 302, where the MSC continues monitoring for the next occurrence of a call ending within the cell. If the determination in step 308 is positive, then control proceeds from step 308 to step 310, where the mobile station is transferred from a TRX with mobile stations having different PVs, to the TRX on which the call just ended. Thus, the system reconfigures itself so that as many mobiles as possible can receive the benefits of TSPC. From step 310, control returns to step 302 and the process repeats. In the process shown in FIG. 3, other appropriate performance indicators or indices, such as ESN for example, can be used instead of the PV.

FIG. 4 shows another embodiment of the present invention, that increases efficiency by putting a mobile station that is not compatible with a performance or capability feature (such as TSPC capability, or capability with respect to a specific version of TSPC) on an available timeslot in a TRX in the cell that has a minimum number of mobile stations that are compatible with the feature. This allows, for example, mobile stations to be gradually concentrated in various TRXes according to their compatibility with different features. The mobile station's PV can indicate, for example, whether the mobile station is compatible with the feature.

In step 402 of FIG. 4 during call setup the MSC determines whether the mobile station is compatible with the feature. If yes, then control proceeds to step 404, where the MSC determines whether there is a TRX in the cell that is using the feature and has an available timeslot. If yes, then control proceeds to step 408, where the call is set up with the mobile station on an available timeslot of a TRX using the feature. From step 408 control proceeds to step 410 and the process ends.

If in step 404 the MSC determines that there is not a TRX in the cell that is using the feature and has an available timeslot, then control proceeds to step 406 where the call is set up with the mobile station on an available timeslot of a TRX in the cell (that is not using the feature). From step 406 control proceeds to step 410 where the process ends.

If in step 402 the MSC determines that the mobile station is not compatible with the feature, then control proceeds to step 412 where the MSC determines which TRX in the cell has the least number of mobile stations that are compatible with the feature, and also has an available timeslot. From step 412 control proceeds to step 414 where the call is set up with the mobile station on the available timeslot of the determined TRX. From step 414 control proceeds to step 410 where the process ends.

In accordance with another exemplary embodiment of the invention, similar principles can be applied when a call that terminates in the cell ends. As shown in FIG. 5, in a first step 502 the MSC monitors TRXes within the cell to determine when a call ends. From step 502 control proceeds to step 504, where the MSC determines whether a call has ended. If not, then control returns to step 502 and the MSC continues to monitor the TRXes until a call ends.

If in step 504 the MSC determines that a call has ended, then control proceeds to step 506 where the MSC determines all mobile stations remaining on the TRX on which the call ended, are compatible with a feature such as a performance feature or capability, for example TSPC. If yes, then control proceeds to step 508, where the MSC determines whether there is a mobile station that is compatible with the feature, on another TRX in the cell that is not using the feature. If yes, then control proceeds from step 508 to step 510, where the mobile station compatible with the feature is transferred to the TRX on which the call ended. From step 510 control proceeds to step 512, where the process ends. Although not shown, control can return from step 512 to step 502, so the overall cycle can repeat.

If in step 508 the MSC determines that there is not a mobile station compatible with the feature on another TRX in the cell that is not using the feature, then control proceeds from step 508 to step 512.

If in step 506 the MSC determines that not all of the mobile stations remaining on the TRX on which call ended, are compatible with the feature, then the process begins a series of steps to determine whether to shift the TRX on which the call ended, towards or away from operation using the feature. In particular, control proceeds from step 506 to step 514, where the MSC determines whether the TRX on which the call ended, has a greater number of mobile stations that are compatible with the feature, than other TRXes in the cell. If yes, then control proceeds to step 508, where the process seeks to transfer in a mobile station that is compatible with the feature. If not, then control proceeds from step 514 to step 516, where a mobile station that is not compatible with the feature is transferred from a TRX having more mobile stations that are compatible with the feature than the TRX on which the call ended. From step 516 control proceeds to step 512, where the process ends. The feature can be, for example, TSPC or a version of TSPC, and the mobile station's PV can indicate, for example, whether the mobile station is compatible with the feature. Note also that when a TRX is not using a feature, it is assumed that at least one of the mobile stations in the TRX is incompatible with the feature, or all of mobile stations in the TRX are compatible with a higher level feature and are operating using the higher level feature. In the process shown in FIG. 5, other appropriate performance indicators or indices, such as ESN for example, can be used instead of the PV.

The processes outlined in FIGS. 4–5 can be repeated within the same cell for different features, for example in a hierarchical manner where newer PVs are backwards compatible. In situations where a number of different protocol versions represented by mobile stations within a cell is greater than a number of carriers or TRXes in the cell, the mobile stations can be sorted among the TRXes so that some PVs are given greater preference than others, depending for example on the relative proportions of represented PVs and the relative merits of the different PVs. In general, mobile stations can be mixed and matched among the various TRXes or carriers depending on particular circumstances, to optimize data flow through the cell or satisfy special needs or priorities.

The algorithms and techniques described above can, of course, be combined with different criteria in order to limit the number of intracell handoffs to different carriers, for example to limit drawbacks such as overhead that are associated with large numbers of handoffs, or to allow various advantages associated with lower numbers or frequency of intracell handoffs. This can be done, for example, by performing intracell handoffs only when the handoffs will actually result in increased usage of TSPC. Alternatively, intracell handoffs can be limited by introducing an appropriate threshold level, and then performing intracell handoff(s) only when an anticipated gain in carrier to interference ratio (C/I) that would result from the intracell handoff(s), exceeds the threshold level.

In summary, sorting mobile stations according to a performance characteristic or capability, or sorting according to a characteristic (such as PV) that corresponds to or indicates a performance capability of the mobile station, allows the mobile stations to be allocated among carriers in a cell, so that an overall performance level of the mobile stations in the cell is maximized. For example, mixing of mobile stations with different PVs on the same carrier can be avoided as far as possible. This allows mobile station capabilities to be used with greater advantage, for example when the protocol used on a carrier must be compatible with the least capable mobile station on the carrier.

The techniques above can be variously applied in different situations, both separately and in various combinations. For example, in a situation where a carrier is not completely filled to capacity with mobile stations, TSPC can be switched on and used, so long as the mobile stations on the carrier all support TSPC (as indicated for example by their having the same PV, and so forth).

In the algorithms described above, "call setup" and "call ending" trigger or initiate an optimization process. The terms "call setup" and "call ending" refer to communication with a specific transceiver, and can include not only regular call setup and call ending operations, but also all types of handoff. In other words, the algorithms described above can be applied not only to call setups and call endings, but also to handoffs, so that a handoff will trigger or initiate the optimization process. These handoffs can include both intercell handoffs and intracell handoffs (for example, when the handoff is performed for reasons other than optimizing the use of TSPC).

It will be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein.

What is claimed is:

1. Method for allocating resources within a cell of a wireless time division multiple access telecommunications system comprising a plurality of mobile stations and at least one base station having a plurality of communication channels, the method comprising the steps of:
   determining which ones of the plurality of communication channels have mobile stations with different protocol versions;
   monitoring the plurality of communication channels to detect a call ending;
   when a call ending is detected in one of the plurality of communication channels, determining whether remaining mobile stations on the communication channel on which the call ended, have the same protocol version as a mobile station on one of the others of the plurality of communication channels;
   when a mobile station on one of the others of the plurality of communication channels has the same protocol version as remaining mobile stations on the communication channel on which the call ended, transferring the mobile station on the one of the others of the plurality of communication channels to a timeslot on the communication channel on which the call ended.

2. Method for allocating resources within a cell of a wireless time division multiple access telecommunications system comprising a plurality of mobile stations and at least one base station having a plurality of communication channels, the method comprising the steps of:
   monitoring the plurality of communication channels to detect a call ending;
   when a call ending is detected,
   determining whether remaining mobile stations on the communication channel on which the call ended, support a predetermined feature;
   when remaining mobile stations on the communication channel on which the call ended, support the predetermined feature, determining whether any of the other communication channels in the plurality both have the predetermined feature disabled, and have a mobile station that supports the predetermined feature;
   when one of the other communication channels in the plurality has a mobile station that supports the predetermined feature and has the feature disabled, transferring the mobile station that supports the predetermined feature to the communication channel on which the call ended.

3. Method of claim 2, further comprising the steps of:
   when remaining mobile stations on the communication channel on which the call ended, do not support the predetermined feature, determining whether the communication channel on which the call ended has a greater number of mobile stations that support the predetermined feature, than others of the plurality of communication channels that have the predetermined feature disabled;
   when the communication channel on which the call ended has a greater number of mobile stations that support the predetermined feature, than others of the plurality of communication channels that have the predetermined feature disabled, determining whether any of the other communication channels in the plurality both have the predetermined feature disabled, and have a mobile station that supports the predetermined feature; and
   when one of the other communication channels in the plurality has a mobile station that supports the predetermined feature and has the feature disabled, transferring the mobile station that supports the predetermined feature to the communication channel on which the call ended.

4. Method of claim 2, further comprising the steps of:

when remaining mobile stations on the communication channel on which the call ended, do not support the predetermined feature, determining whether the communication channel on which the call ended has a greater number of mobile stations that support the predetermined feature, than others of the plurality of communication channels that have the predetermined feature disabled;

when the communication channel on which the call ended does not have a greater number of mobile stations that support the predetermined feature, than others of the plurality of communication channels that have the predetermined feature disabled, transferring a mobile station that does not support the predetermined feature, from one of the telecommunications channels in the plurality that has a greater number of mobile stations that support the predetermined feature, to the communication channel on which the call ended.

5. The method of claim 2, wherein the predetermined feature is Time Slot Power Control.

6. A wireless time division multiple access communication system, comprising:

at least one base station having a plurality of communication channels; and a plurality of mobile stations, wherein the system determines which ones of the plurality of communication channels have mobile stations with different protocol versions, monitors the plurality of communication channels to detect a call ending, and when a call ending is detected in one of the plurality of communication channels, the system determines whether remaining mobile stations on the communication channel on which the call ended have the same protocol version as a mobile station on one of the others of the plurality of communication channels, and when a mobile station on one of the others of the plurality of communication channels has the same protocol version as remaining mobile stations on the communication channel on which the call ended, the system transfers the mobile station on the one of the others of the plurality of communication channels to a timeslot on the communication channel on which the call ended.

7. A wireless time division multiple access communication system, comprising:

at least one base station having a plurality of communication channels; and a plurality of mobile stations; wherein the system monitors the plurality of communication channels to detect a call ending, and when a call ending is detected, the system determines whether remaining mobile stations on the communication channel on which the call ended, support a predetermined feature, and when remaining mobile stations on the communication channel on which the call ended, support the predetermined feature, the system determines whether any of the other communication channels in the plurality both have the predetermined feature disabled, and have a mobile station that supports the predetermined feature; and when one of the other communication channels in the plurality has a mobile station that supports the predetermined feature and has the feature disabled, the system transfers the mobile station that supports the predetermined feature to the communication channel on which the call ended.

8. The system of claim 7 further comprising:

means for comparing the number of mobile stations that support the predetermined feature on the channel on which the call ended to the number of mobile stations on the plurality of communication channels that have the predetermined feature disabled, and means for transferring a mobile station that supports the predetermined feature from one of the telecommunications channels in the plurality that has a greater number of mobile stations that support the predetermined feature, to the communication channel on which the call ended.

9. The method of claim 7, wherein the predetermined feature is Time Slot Power control.

* * * * *